United States Patent
Barker

[15] 3,635,668
[45] Jan. 18, 1972

[54] COPPER HYDRATE PRODUCTION
[72] Inventor: James Barker, Freehold, N.J.
[73] Assignee: Cities Service Company, New York, N.Y.
[22] Filed: Mar. 21, 1969
[21] Appl. No.: 809,413

[52] U.S. Cl. .................................................23/147, 424/140
[51] Int. Cl. .......................................C01g 3/02, A01n 11/04
[58] Field of Search ..................................23/147; 424/140

[56] References Cited

UNITED STATES PATENTS

| | | | |
|---|---|---|---|
| 1,800,828 | 4/1931 | Furness | 23/147 |
| 1,867,357 | 7/1932 | Furness | 23/147 |
| 2,109,683 | 3/1938 | Seibert | 424/140 |
| 3,231,464 | 1/1966 | Dettwiler et al. | 23/147 X |

FOREIGN PATENTS OR APPLICATIONS

| | | | |
|---|---|---|---|
| 1,318,095 | 3/1962 | France | 23/147 |

Primary Examiner—Earl C. Thomas
Assistant Examiner—G. Alvaro
Attorney—J. Richard Geaman

[57] ABSTRACT

Copper sulfate, sodium hydroxide and aqueous ammonia are mixed at a pH of 10 to 12.5, the reaction mixture containing 3 to 10 grams of ammonia per liter of reaction mixture. The reactants may be fed to the reaction zone as separate streams or, if desired, the copper sulfate solution and the aqueous ammonia may be initially mixed and fed together to the reaction zone for mixture with the sodium hydroxide. The reaction temperature is maintained at less than 112° F. and the retention time is controlled so as to avoid the undesired decomposition of the cupric hydroxide product to copper oxide. The product thus obtained comprises an essentially pure cupric hydroxide product suitable for use as a chemical intermediate. In addition, the product obtained at a pH of above about 11.7 has a particle size sufficiently small so as to make the product highly suitable for use as a fungicide.

25 Claims, No Drawings

COPPER HYDRATE PRODUCTION

BACKGROUND OF THE INVENTION

1. Field of the Invention

This invention relates to the manufacture of cupric hydroxide. More particularly, it relates to an improved process for the manufacture of a pure cupric hydroxide product.

2. Description of the Prior Art

Cupric hydroxide, otherwise known as copper hydrate, is commercially available at the present time in two forms. One form is a pure cupric hydroxide product that is used as an intermediate compound in the manufacture of copper naphthenate, artificial silk and other products. This pure cupric hydroxide product is normally made in such a manner as to provide good sedimentation and filtration characteristics. This form of product, however, is not suitable for use as a fungicide because of its relatively large particle size. The preparation of such a pure cupric hydroxide product is disclosed in the Furness patent, U.S. Pat. No. 1,800,828.

Cupric hydroxide is also prepared in the form of an impure product, frequently containing bound phosphate. This product has a small particle size and is well suited for use as a fungicidal material. Processes for the manufacture of this impure product for fungicidal application are described in the U.S. Pat. No. Re 24,324 to Furness and in the Page patent, U.S. Pat. No. 2,924,505.

While the processes referred to above have been generally satisfactory for their intended purpose, there is nevertheless a need and desire in the art for a satisfactory process for the production of a cupric hydroxide product suitable for use both as a chemical intermediate and as a fungicide. This result has been achieved by the novel process of the present invention as hereinafter set forth in detail, the novel features thereof being pointed out in the appended claims.

SUMMARY OF THE INVENTION

The present invention provides for the production of cupric hydroxide by a process comprising the mixing of a copper sulfate solution, a solution of sodium hydroxide and aqueous ammonia. These reactants may be mixed in either a batch operation or in a continuous process. The relative mixing rates for these reactants is such as to maintain a pH in the range of from about 10 to about 12.5. In addition, the mixing rates should be such as to provide from about 3 to about 10 grams of ammonia per liter of the reaction mixture.

In order to avoid the undesired decomposition of the cupric hydroxide product, the temperature of the reaction mixture should be maintained at less than 112° F. Thus, the reaction temperature may be cooled so as to maintain a temperature within the range of from about 85° to about 110° F. The retention time of the reactants in the reaction zone should also be controlled so as to avoid the undesired decomposition of the cupric hydroxide product. Thus, at temperatures at the upper end of the indicated temperature range, the retention time of the reactants in the reaction zone should be maintained generally at from about one-half minute to about 10 minutes. At temperatures approaching 85° F., or lower, longer retention times may be tolerated without undesired decomposition of the product.

Cupric hydroxide is formed as a precipitate and may conveniently be separated from the reaction mixture. This separation may readily be accomplished by withdrawing a slurry of the precipitated product from the reaction mixture and thereafter separating the cupric hydroxide product from the liquid reaction products. The separated product is thereafter washed and dried prior to storage and ultimate use.

The reactants may be mixed as separate streams or, alternatively, the copper sulfate and the aqueous ammonia may be initially mixed to form a premix that is thereafter mixed with the sodium hydroxide solution in the reaction zone. When the copper sulfate and the aqueous ammonia are premixed, the retention time of the reactants in the reaction zone is of less significance than when the reactants are added separately thereto. In another embodiment, aqueous ammonia may be added to a heel of water in the reaction zone with the copper sulfate and sodium hydroxide being added thereafter to the aqueous ammonia in the reaction zone.

The copper hydrate product of the present invention is an essentially pure cupric hydroxide product that is suitable for use as a chemical intermediate. When the reaction is carried out at a pH of about 11.7 or higher, the product is obtained with a particle size sufficiently small to make it also very suitable for fungicidal purposes.

DETAILED DESCRIPTION OF THE INVENTION

As indicated above, the present invention relates to the production of an essentially pure copper hydrate product by the reaction of copper sulfate, aqueous ammonia and sodium hydroxide. These reactants may be mixed in either a batch process or in a continuous operation. In one embodiment, the copper sulfate, the sodium hydroxide and the aqueous ammonia are added simultaneously to a reactor as three separate reactant streams. In another embodiment, the copper sulfate solution and the aqueous ammonia may be mixed to form a premix that is added as a single reactant stream to the reactor, into which a separate sodium hydroxide stream is added.

In a batch-type operation, several embodiments have been found feasible under appropriate circumstances. In one embodiment of the batch-type operation, the reactants may be added to a reaction vessel in which an initial quantity, or heel, of water has been inserted. In another embodiment, the copper sulfate solution and aqueous ammonia are premixed and are thereafter mixed with sodium hydroxide in the reaction vessel. In a third embodiment of the batch-type process, the ammonia is added to a heel of water in the reaction vessel, followed by the addition of the copper sulfate and sodium hydroxide thereto.

Irrespective of the particular embodiment in which the reactants are mixed, the pH of the reaction mixture should be maintained in the range of from about 10 to about 12.5. At a pH of less than about 10, it has been found that the intermediate product formed by the reaction of the copper sulfate and the aqueous ammonia tends to remain in this form and is not converted, by reaction with sodium hydroxide, into the desired cupric hydroxide product. At a pH of above 12.5, on the other hand, it has been found that the product tends to decompose to the less desired copper oxide.

It has further been determined that if the pH is maintained at above about 11.7, as from about 11.7 to about 12.5, the product cupric hydroxide may be obtained in a form having a very small particle size and a large surface area. This fine product, which is suitable for use as a chemical intermediate, is, therefore, also highly suitable and useful as a fungicide.

One of the problems frequently associated with the previously known methods for producing cupric hydroxide has been the difficulty in maintaining proper control of the reaction conditions so as to avoid the undesired decomposition of the product to the less desired copper oxide. In the practice of the present invention, however, adequate control of the reaction conditions may conveniently and satisfactorily be controlled by providing at least about 3 grams of ammonia per liter of the reaction mixture. If the amount of ammonia should exceed about 10 grams per liter of reaction mixture, on the other hand, the yield of copper in the form of the desired cupric hydroxide product tends to be adversely effected. While the amounts of the individual reactants employed does not constitute an essential feature of the present invention so long as the desired amounts are such as to maintain the desired pH range, therefore, it has generally been found desirable to maintain the quantity of ammonia at from about 3 to about 10 grams per liter of the reaction mixture, conveniently at from about 3 to about 5 grams per liter. It has also been found desirable to employ about 2 moles of sodium hydroxide per mole of copper sulfate reactant employed in the reaction mixture.

The concentration of the reactants employed in the practice of the present invention is not a critical feature of the invention. To the contrary, the concentration of the reactants appears to have little or no effect on the process or the product obtained. It has generally been found desirable, however, to employ a relatively dilute sodium hydroxide solution, as for example on the order of 10 percent by weight, in order to facilitate the maintaining of the reaction temperature within the desired limits. The concentration of the aqueous ammonia may also be varied without significant effect on the process or product, with commercial concentrations of about 28 percent by weight ammonia generally being satisfactory. Similarly, any convenient copper sulfate concentration, such as a one molar solution, can conveniently be employed.

At a temperature of about 112° F., the desired cupric hydroxide product decomposes to copper oxide. The temperature of the reaction mixture, or slurry, therefore, should be maintained at less than 112° F., conveniently in the range of from about 85° to about 110° F. Reaction temperatures lower than about 85° F. may also be employed although operation at such lower temperatures would generally be less desirable since refrigeration means would ordinarily be required in order to maintain the reaction temperature at such lower values.

In addition to the decomposition that occurs if higher temperatures are employed, it has been found that the product tends, also, to decompose if the reaction mixture is retained in the reaction zone for extended periods of time. For this reason, the reactor size and the rate of reactant addition are desirably determined so as to provide a retention time in the reaction zone of generally from about one-half to about 10 minutes. Conveniently, the retention time will be maintained at from about one-half to about 3 minutes. Retention for longer periods of time at the more elevated end of the temperature range tends to result in the undesired decomposition of the product, although longer retention times may be maintained due to the lower decomposition rates at temperatures of about 85° F. or lower. Retention times of less than about one-half minute are also within the scope of the present invention, although equipment limitations may preclude the use of such lower retention times. The product slurry, upon leaving the reactor, has been found to be stable for at least several days. As used herein, the term reactor, or reaction zone, is used to refer to the region in which the reaction mixture is exposed to the overall operating conditions as set forth herein.

Because of existing equipment limitations, the retention time in batch-type processes will often extend to an hour or more in reactors of sufficient size for commercial-scale operations. At such retention times, the cupric hydroxide product will likely undergo an undesirable decomposition to copper oxide. If the size of the reactor were to be restricted or if the existing equipment limitations were overcome so that a retention time of from about one-half minute or less to about 10 minutes were feasible, a stable cupric hydroxide product would be obtained by operations within the indicated operating conditions. In certain batch-type operations, however, it has been found that the retention time of the batch in the reaction zone is of lesser significance than in the other indicated embodiments. One such embodiment is that in which the copper sulfate and aqueous ammonia are premixed and sodium hydroxide is thereafter added to the premix. In this embodiment, it has been found that the retention time up to a pH of about 9 is of no consequence with regard to the production of a fungicidal product, provided that the retention time of the reaction mixture in the reaction zone at a pH of above about 9 is maintained at from about one-half minute or less to about 10 minutes. Thus, the total retention time may, in this instance, approach or exceed 1 hour, provided the time limitation at above a pH of about 9 is maintained.

The effect of retention time has also been found to have less significance in the batch-type operation in which the aqueous ammonia is first added to a heel of water in the reactor. In this embodiment, copper sulfate and sodium hydroxide are thereafter added to the aqueous ammonia. The retention time, in this instance, can be extended considerably beyond 10 minutes without decomposition the cupric hydroxide product, with the permissible retention time extending into the existing commercial range for such batch-type operations.

The process of the present invention produces a product slurry in which the cupric hydroxide is obtained as the insoluble solid reaction product. Separation of this product from the liquid reaction products may be carried out in any of the well-known, conventional equipment designed for decantation, centrifugation, or the like. In one embodiment of this invention, the product may conveniently be separated by withdrawing, continuously if desired, a portion of the product slurry from the reaction zone and feeding such withdrawn slurry to the conventional separation equipment to be employed. If the cupric hydroxide product is separated from the slurry by decantation, the resulting thickened slurry will generally be subjected to a filtration operation in order to recover the cupric hydroxide product.

The product recovered by any such conventional separation means is thereafter washed thoroughly to assure that it is free of caustic and is thereafter dried at temperatures of up to about 180° F. It has been found that at higher temperatures, the product tends to become unstable, resulting in the degradation of the product to one containing copper oxide. The thus recovered and treated product is stable and may be stored in the dry stage at temperatures up to about 180° F. If desired, the product may also be stored as a wet cake, preferably at temperatures up to 150° F. without conversion to copper oxide over relatively long periods of time.

The copper hydrate of the present invention has been found to comprise a stable and pure cupric hydroxide, $Cu(OH)_2$, well suited for use as a chemical intermediate in accordance with conventional practice. When formed in accordance with the process of the present invention, particularly at a pH of above about 11.7, the product is obtained in the form of very fine particles having a high surface area.

The particle size and surface area of various cupric hydroxide products obtainable in accordance with the present invention are summarized in table I below. In this table, the BET values refer to the total surface area as measured by the standard nitrogen absorption method, in square meters per gram, while the oil absorption values refer to the surface area measurements in accordance with the standard Gardner oil absorption method. The particle size measurements were obtained from electron micrographs of the product samples.

TABLE

| BET surface Area m.²/g. | Oil absorption ml. oil/100 g. sample | Average particle size in microns | |
|---|---|---|---|
| | | Diameter | Length |
| 11.4 | 47.2 | 0.108 | 1.447 |
| 16.8 | 77.5 | 0.073 | 0.982 |
| 23.0 | 100.0 | 0.054 | 0.724 |
| 24.5 | 104.5 | 0.050 | 0.673 |
| 28.0 | 120.0 | 0.048 | 0.636 |
| 27.0 | 130.5 | 0.046 | 0.611 |
| 32.6 | 137.5 | 0.038 | 0.506 |
| 33.0 | 140.0 | 0.037 | 0.498 |
| 38.5 | 163.0 | 0.032 | 0.429 |
| 55.8 | 193.5 | 0.022 | 0.296 |
| 56.0 | 200.0 | — | — |

It has been found that cupric hydroxide having an oil absorption value of at least about 100 ml. of oil per 100 grams of sample is suitable for use as a fungicide, with product having an oil absorption value above 120 and more particularly above 200 being especially useful for fungicidal purposes due to their large surface area and small particle size. Cupric hydroxide product having oil absorption values as high as about 300 ml. of oil per 100 gram sample have been obtained by means of the present invention. Table I shows the relationship of BET and oil absorption values, as well as the corresponding average particle size measurements, for various cupric hydroxide product samples, with the surface area, as reflected by oil absorption and BET values, increasing as the particle size of the product samples decreased.

Because of its very fine particle size and high surface area, the cupric hydroxide product of the present invention is thus highly suitable for use as a fungicide. For this purpose, the product may be dusted on the foliage to be treated or may be dispersed in water and sprayed over the foliage or crops to be treated in a manner well known in the art. In addition, of course, the pure cupric hydroxide product of the present invention may also be used in a manner well known in the art as a chemical intermediate in the manufacture of copper naphthenate, artificial silk and other products.

In order to further illustrate the various features of the present invention, a series of runs is summarized in table II below. In these runs, the copper sulfate solution, the aqueous ammonia, and the sodium hydroxide solution were added as separate streams in a continuous process for the production of cupric hydroxide, unless otherwise noted in the table. The variations in operating conditions are set forth in the table.

been of such a coarse particle size as to render it unacceptable for use as a fungicide.

While the present invention has been described herein with reference to particular embodiments thereof, it will be appreciated by those skilled in the art that various changes and modifications can be made therein without department from the scope of the invention as set forth in the appended claims.

Therefore, I claim:

1. A process for the production of cupric hydroxide comprising:
    a. mixing a copper sulfate solution, a solution of sodium hydroxide and aqueous ammonia in a reaction zone, the relative mixing rates of these reactants being such as to maintain a pH in the range of from about 10 to 12.5 and to provide from about 3 to about 10 grams of ammonia per liter of the reaction mixture, maintaining the reaction temperature at below about 112° F.; and
    b. separating the resulting cupric hydroxide precipitate from the reaction mixture, whereby a cupric hydroxide product useful as a chemical intermediate is obtained.

2. The process of claim 1 in which the pH is from about 11.7 to about 12.5, whereby said cupric hydroxide product is also

TABLE II

| | Percent by weight CuSO$_4$ | Percent by weight NaOH | NH$_3$, g./liter reaction mixture | Temp., ° F. | pH | Retention time, min. | Oil absorption, ml./100g. sample |
|---|---|---|---|---|---|---|---|
| Effect of NH$_3$ concentration | 9.1 | 10 | 1.87 | 97 | 11.3 | 1 | (¹) |
| | 5.0 | 25 | 2.94 | 89 | 11.5 | 1 | 72 |
| | 9.1 | 10 | 3.74 | 95 | 11.3 | 1 | 85 |
| | 5.0 | 25 | 4.67 | 88 | 11.5 | 1 | 64 |
| | 9.1 | 10 | 7.46 | 92 | 11.3 | 1 | 67 |
| Effect of pH | 9.1 | 10 | 3.74 | 96 | 11.5 | 1 | 72 |
| | 9.1 | 10 | 3.74 | 94 | 11.7 | 1 | 219 |
| | 9.1 | 10 | 3.74 | 95 | 11.9 | 1 | 253 |
| | 9.1 | 10 | 3.74 | 95 | 12.1 | 1 | 243 |
| | 9.1 | 10 | 3.74 | 96 | 12.3 | 1 | 225 |
| Effect of reactant concentration | 9.1 | 10 | 3.74 | 93 | 11.5 | 1 | 72 |
| | 13.8 | 10 | 3.74 | 93 | 11.3 | 1 | 121 |
| | 13.8 | 50 | 3.74 | 96 | 11.5 | 1 | 107 |
| | 5.0 | 25 | 3.5 | 88 | 11.3 | 1 | 112 |
| Effect of retention time | 10 | 10 | 3.74 | 81 | 11 | 1 | 93 |
| | 10 | 10 | 3.74 | 81 | 11 | 2 | 93 |
| | 10 | 10 | 3.74 | 81 | 11.3 | 5 | 75 |
| Effect of temperature | 10 | 10 | 3.74 | 88 | 11.5 | 1 | 112 |
| | 10 | 10 | 3.74 | 93 | 11.3 | 1 | 121 |
| Batch process—simultaneous addition of CuSO$_4$ and NaOH to aqueous ammonia | 10 | 10 | 3.74 | 114 | 11.3 | 1 | (¹) |
| Batch process—addition of NaOH to CuSO$_4$ and aqueous ammonia | 13.8 | 10 | 7.9 | 82 | 12.0 | 60 | 175 |
| | 13.8 | 10 | 7.9 | 82 | 12.0 | 2 | 174 |
| | 13.8 | 10 | 7.9 | 82 | 12.0 | 15 | 181 |
| | 13.8 | 10 | 7.9 | 82 | 12.0 | 60 | 200 |

¹ Product decomposes.

As shown in table II, the operating conditions can be controlled so as to assure against the undesired decomposition or conversion of the cupric hydroxide product to copper oxide. Thus, at least about 3 grams of ammonia per liter of reaction mixture should be provided. The reaction temperature should likewise be maintained generally at below about 112° F. As shown by the data presented, retention times in the specified batch-type operations can be extended without decomposition of the product. The data clearly shows, in addition, the desirability of operating at a pH of above about 11.7 in order to produce a very fine product having a large surface area and being particularly well suited for use as a fungicide.

The present invention offers a distinct advantage over the processes heretofore available for the production of cupric hydroxide. The present invention thus provides a simplified and economic process involving the use of relatively inexpensive starting materials. The process is subject to convenient control and is readily adapted for either batch or continuous operations. The product obtained by the present invention is a stable, chemically pure product suitable for use as a chemical intermediate in the production of valuable end products. In addition, the present invention permits the obtaining of this pure cupric hydroxide product in the form of very fine particles highly suitable for use as a fungicide, whereas the chemically pure product heretofore available in the art has generally useful as a fungicide.

3. The process of claim 1 in which the amount of ammonia present is from about 3 to about 5 grams per liter of reaction mixture.

4. The process of claim 1 in which said copper sulfate, sodium hydroxide and aqueous ammonia are mixed as continuous streams.

5. The process of claim 1 in which the reaction temperature is maintained at from about 85° to about 110° F.

6. The process of claim 5 in which the retention time of said reaction mixture in the reaction zone is less than about 10 minutes.

7. The process of claim 5 in which the retention time of said reaction mixture in the reaction zone is from about one-half minute to about 10 minutes.

8. The process of claim 7 in which said retention time is from about one-half minute to about 3 minutes.

9. The process of claim 4 in which the separation of cupric hydroxide precipitate from the reaction mixture comprises withdrawing from the reaction zone a slurry comprising said precipitate in liquid reaction products and thereafter separating said cupric hydroxide from said liquid reaction products.

10. The process of claim 9 in which the slurry withdrawn from the reaction zone is passed to a slurry-thickening zone from which wet cupric hydroxide product is withdrawn.

11. The process of claim 10 in which the cupric hydroxide product is thereafter filtered, washed and dried.

12. The process of claim 1 and including the initial mixing of the copper sulfate solution and said aqueous ammonia to form a premix and mixing said premix with the solution of sodium hydroxide in said reaction zone.

13. The process of claim 12 in which said premix and said sodium hydroxide are mixed as continuous streams.

14. The process of claim 12 in which about 2 moles of sodium hydroxide are employed per mole of copper sulfate.

15. The process of claim 12 in which the pH of the reaction mixture is in the range of from about 11.7 to about 12.5.

16. The process of claim 16 in which the reaction temperature is maintained at from about 85° to about 110° F.

17. The process of claim 16 in which the separation of cupric hydroxide precipitate from the reaction mixture comprises withdrawing from the reaction zone a slurry comprising said precipitate in liquid reaction products and thereafter separating said cupric hydroxide from said liquid reaction products.

18. The process of claim 1 in which said reactants are mixed in a batch operation.

19. The process of claim 18 in which said reactants are added to a heel of water in said reaction zone.

20. The process of claim 19 in which the pH of the reaction mixture is from about 11.7 to about 12.5, and the retention time of said reaction mixture in the reaction zone is from about one-half minute to about 10 minutes, whereby said cupric hydroxide product is also useful as a fungicide.

21. The process of claim 18 in which the copper sulfate and aqueous ammonia are premixed and sodium hydroxide is thereafter added to said premix.

22. The process of claim 21 in which the pH of the reaction mixture is from about 11.7 to about 12.5, and the retention time of said reaction mixture in the reaction zone at a pH of above about 9 is from about one-half minute to about 10 minutes, whereby said cupric hydroxide product is also useful as a fungicide.

23. The process of claim 18 in which aqueous ammonia is added to a heel of water in the reaction zone and copper sulfate and sodium hydroxide are thereafter added to said aqueous ammonia.

24. The process of claim 23 in which the pH of the reaction mixture is from about 11.7 to about 12.5, whereby said cupric hydroxide product is also useful as a fungicide.

25. The process of claim 18 in which about 2 moles of sodium hydroxide are employed per mole of copper sulfate.

* * * * *